United States Patent
Glaentz et al.

(10) Patent No.: US 11,761,424 B2
(45) Date of Patent: Sep. 19, 2023

(54) BRAKE OF A LARGE WIND TURBINE

(71) Applicant: Aktiebolaget SKF, Gothenburg (SE)

(72) Inventors: Wolfgang Glaentz, Schweinfurt (DE);
Henning Kern, Dittelbrunn (DE);
Hans-Juergen Liesegang, Schortens (DE)

(73) Assignee: AKTIEBOLAGET SKF, Gothenburg (SE)

(*) Notice: Subject to any disclaimer, the term of this patent is extended or adjusted under 35 U.S.C. 154(b) by 893 days.

(21) Appl. No.: 16/488,990

(22) PCT Filed: Mar. 1, 2018

(86) PCT No.: PCT/EP2018/055049
§ 371 (c)(1),
(2) Date: Aug. 27, 2019

(87) PCT Pub. No.: WO2018/158368
PCT Pub. Date: Sep. 7, 2018

(65) Prior Publication Data
US 2020/0063711 A1 Feb. 27, 2020

(30) Foreign Application Priority Data
Mar. 3, 2017 (DE) .................. 10 1017 203 497.1

(51) Int. Cl.
*F03D 7/02* (2006.01)
*F16D 55/28* (2006.01)
(Continued)

(52) U.S. Cl.
CPC .......... *F03D 7/0248* (2013.01); *F16D 55/28* (2013.01); *F16D 65/127* (2013.01);
(Continued)

(58) Field of Classification Search
CPC ...... F03D 7/0248; F16D 55/28; F16D 65/127; F16D 2066/003; F16D 2066/005; F16D 2069/003
See application file for complete search history.

(56) References Cited

U.S. PATENT DOCUMENTS 8,269,367 B2 * 9/2012 Wei .................. F16D 55/2245
416/169 R
8,593,006 B2 * 11/2013 Wohlleb .................. F03D 15/10
416/14
(Continued)

FOREIGN PATENT DOCUMENTS

CN 1641241 A 7/2005
CN 101713382 A 5/2010
(Continued)

OTHER PUBLICATIONS

International Search Report and Written Opinion of the International Searching Authority in PCT/EP2018/055049 dated May 31, 2019.
(Continued)

*Primary Examiner* — Thomas W Irvin
(74) *Attorney, Agent, or Firm* — J-TEK LAW PLLC; Scott T. Wakeman; Mark A. Ussai

(57) ABSTRACT

A system includes a wind turbine having a fixed part and a rotational part and a brake having a brake disk mounted to the rotational part for rotation with the rotational part. At least one brake block is fixed relative to the fixed part and has a friction surface facing the brake disk. The brake block is shiftable between a first position with the friction surface spaced from the brake disk and a second position with the friction surface in contact with and pressed against the brake disk, and the friction surface and/or the brake disk are configured such that pressing the at least one brake block
(Continued)

against the brake disk creates a micro-interference fit between the at least one brake block and the brake disk.

15 Claims, 2 Drawing Sheets

(51) Int. Cl.
*F16D 65/12* (2006.01)
*F16D 66/00* (2006.01)
*F16D 69/00* (2006.01)

(52) U.S. Cl.
CPC ... *F05B 2260/902* (2013.01); *F05B 2270/331* (2013.01); *F16D 2066/003* (2013.01); *F16D 2066/005* (2013.01); *F16D 2069/003* (2013.01)

(56) References Cited

U.S. PATENT DOCUMENTS

| | | | | |
|---|---|---|---|---|
| 8,816,520 B2* | 8/2014 | Bywaters | ............ | F03D 7/0296 |
| | | | | 290/44 |
| 9,004,240 B2* | 4/2015 | Palumbo | ............ | F16D 69/027 |
| | | | | 188/251 A |
| 9,551,386 B2* | 1/2017 | Polito | ............ | F16D 51/12 |
| 10,518,761 B2* | 12/2019 | Thomas | ............ | B60T 13/746 |
| 2010/0079019 A1 | 4/2010 | Buskirk et al. | | |
| 2010/0258390 A1* | 10/2010 | Culbertson | ............ | F16D 65/18 |
| | | | | 188/156 |
| 2011/0169268 A1* | 7/2011 | Wei | ............ | F03D 7/0248 |
| | | | | 188/218 XL |
| 2011/0299975 A1 | 12/2011 | Pechlivanoglou | | |
| 2012/0146333 A1* | 6/2012 | Bywaters | ............ | F03D 7/0248 |
| | | | | 290/44 |
| 2012/0187683 A1* | 7/2012 | Wohlleb | ............ | F03D 15/10 |
| | | | | 290/44 |
| 2012/0189442 A1 | 7/2012 | Wohlleb | | |
| 2013/0313054 A1* | 11/2013 | Polito | ............ | F03D 7/0248 |
| | | | | 188/78 |
| 2014/0242405 A1* | 8/2014 | Palumbo | ............ | F16D 69/027 |
| | | | | 428/656 |
| 2018/0001878 A1* | 1/2018 | Thomas | ............ | H02K 7/102 |
| 2018/0320661 A1* | 11/2018 | Hinken | ............ | F16D 55/025 |

FOREIGN PATENT DOCUMENTS

| | | |
|---|---|---|
| CN | 102317621 A | 1/2012 |
| CN | 103452758 A | 12/2013 |
| CN | 105408624 A | 3/2016 |
| DE | 9402867 U1 | 4/1994 |
| DE | 102009010671 A1 | 9/2010 |
| DE | 202011050344 U1 | 9/2012 |
| DE | 102012202438 B3 | 3/2013 |
| EP | 2290251 A1 | 3/2011 |
| EP | 2479428 A1 | 7/2012 |
| EP | 2628948 A2 | 8/2013 |
| JP | 2011223682 A | 11/2011 |
| JP | 2014020469 A | 2/2014 |
| WO | 9403960 A1 | 2/1994 |
| WO | 2014187510 A1 | 11/2014 |

OTHER PUBLICATIONS

Office Action and Search Report from the Chinese Patent Office dated Sep. 10, 2020 in related Chinese application No. CN 201880014943, and translation thereof.

Second Office Action and Supplementary Search Report from the Chinese Patent Office dated Apr. 6, 2021 in related Chinese application No. CN 201880014943, and translation thereof.

* cited by examiner

BRAKE OF A LARGE WIND TURBINE

CROSS-REFERENCE

This application is the U.S. National Stage of International Application No. PCT/EP2018/055049 filed on Mar. 1, 2018, which claims priority to German patent application no. 10 2017 203 497.1 filed on Mar. 3, 2017.

TECHNICAL FIELD

The invention relates to a brake of a large wind turbine.

BACKGROUND

In large wind turbines locking systems are known for rotational parts provided for rotation; the locking systems work according to the principle of an insertable locking bolt. Due to the forces to be withstood, such locking systems are massive, voluminous, heavy, and thus also cost-intensive.

SUMMARY

An object of the invention is to provide an improvement in this respect.

The invention is based inter alia on the recognition of the following disadvantages of previous solutions: In one of the previous solutions for a secure rotational locking of a main shaft of a large wind turbine, the main shaft is connected to a massive, thick disc, formed in a washer-type manner, that encircles the main shaft, wherein the disc includes axial penetrations distributed in the circumferential direction. A locking device in interaction with said disc is provided, using which a massive bolt can be pushed into one of the penetrations, optionally in a hydraulically driven manner, so that the main shaft is then securely rotationally locked. In order to control the necessary retaining forces, the axial thickness of the disc is sufficiently large. The same applies to the bolt. Often a plurality of these locking mechanisms distributed over the circumference are required. Finally, the position at which the bolt or bolts can generally be retracted into the penetration(s) is usually adjusted by manual control; thus the risk exists that with an inexact alignment of the hydraulic system the bolt presses against the disc outside of the penetrations, which leads to corresponding, in some instances severe, damage, for example even damage, due to the excessive load in the axial direction, to the rolling-element bearing assemblies supporting the main shaft.

The above-mentioned disadvantages are avoided by the inventive solution. The risk of damage due to comparable incorrect actuation, similar to that described above, is inherently precluded. With further advantage a sensor system can be added to said inherency, which sensor system, in combination with a corresponding control and monitoring unit, also reliably prevents less-serious incorrect actuations. For example, an actuation of the inventive locking brake is only permitted when a complete or approaching stoppage of the main shaft has been detected by the sensor system. Furthermore the rotational position of the individual rotor blades and/or the rotational position of the unit of the usually three rotor blades with respect to the tower of the large wind turbine can also be taken into account.

Due to the, for example, brake-disc-type functioning of the inventive solution, the disc can be configured very much less massive, in particular thinner, which means a considerable weight and cost advantage. In particular with the design of the brake drive as an electrical actuator, the otherwise customary hydraulic system can be omitted. If this is combined in particular with a self-locking or self-blocking design of the electrical actuator, a system arises in a particularly simple manner that reliably maintains the locking of the main shaft even in the event of a power failure. In the case of a hydraulically actuated brake this can also be ensured by a correspondingly secure design of the hydraulic system or by additional mechanical securing measures.

Further advantages, features and details of the invention arise from the exemplary embodiments of the invention described in the following with the assistance of the Figures.

DETAILED DESCRIPTION

Figure 1:
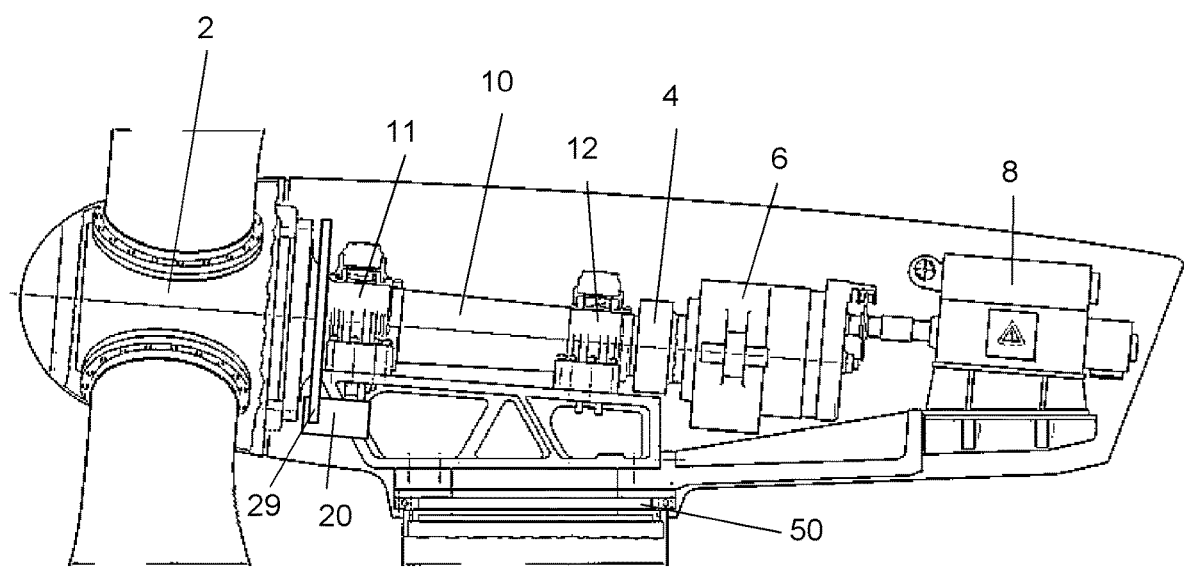
FIG. 1 shows a schematic sketch of a tower housing of a wind turbine including an inventive brake system.

FIG. 1 shows, in the form of a schematic sketch, partially in section, the interior of a tower housing or of a nacelle of a large wind turbine, in particular in the multimegawatt range, including an inventive brake system. Here in the tower housing a main shaft 10 of the wind turbine is located, at whose left axial end the rotor blade hub 2 with typically three pivotable rotor blades is connected to the main shaft 10. At the right axial end of the main shaft 10 it is connected via a coupling 4 to a transmission 6, wherein on the other side the transmission 6 is in turn connected to a generator 8 for electrical energy generation. Here the tower housing is rotatably supported on a tower of the large wind turbine via a tower-housing bearing 50.

The main shaft 10 is rotatably supported in the tower housing via two rolling-element bearing assemblies. Here the left rolling-element bearing assembly is configured as a toroidal roller bearing 11, which is also known as a CARB bearing, and the right as a spherical roller bearing 12. In other embodiments other bearing types are of course possible, in particular a double row tapered roller bearing in back-to-back arrangement, or also cylindrical roller bearings. In turn in other embodiments only one rolling-element bearing assembly can also be present, wherein then the transmission 6 can function so to speak as a second bearing point.

Thus for example to carry out maintenance work a person can and must enter the rotor-blade hub region; it must be ensured under all circumstances that the main shaft 10 does not execute any rotational or pivoting movements, since otherwise life and limb of the maintenance personnel in the rotor-blade hub region can be endangered. For this purpose the inventive brake system is provided that is configured in the described exemplary embodiment in the manner of a brake-disc-based locking brake. Here the brake system comprises a brake disc 29 fixedly connected to the main shaft 10, in conjunction with a brake base unit 20 fixedly connected to the tower housing. Here, depending on the turbine size, dimensioning, and design only the one brake base unit 20 may be provided; however, a plurality of brake base units 20 can also be provided distributed over the circumference of the brake disc 29.

Figure 2:
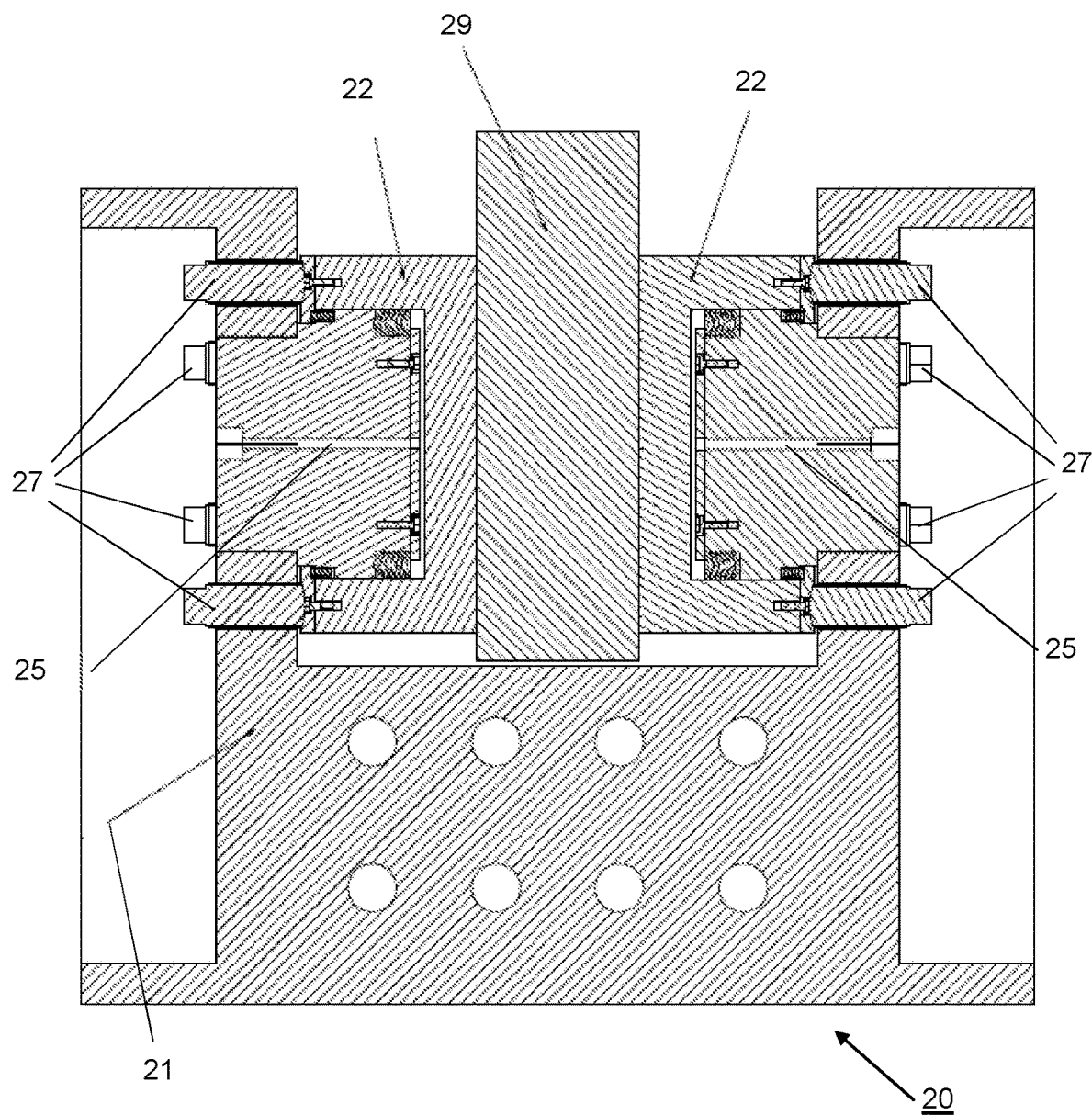
FIG. 2 shows a cut-out enlargement in the region of the brake system of FIG. 1.

FIG. 2 shows a longitudinal section through the brake system of FIG. 1 in the region of the brake base unit 20. In normal operation the brake disc 29 rotates with the main shaft 10 such that no or at least no appreciable contact takes place with parts of the brake base unit 20. For example, for maintenance work in the rotor-blade hub region the main shaft 10 of the wind turbine is brought to a standstill, for example, by a corresponding rotor blade adjustment and/or a brake disposed between the transmission 6 and the generator 8. The brake blocks 22 configured so to speak as hydraulic cylinders are then pressed against the brake disc in the axial direction by corresponding hydraulic pressurization via the hydraulic channels 25. Here the hydraulic channels 25 are formed in a base body 21 of the brake base unit 20, which base body is fixedly connected to the tower housing.

Furthermore the brake blocks 22 are friction-coated on their end surface facing the brake disc 29 so that a micro-interference-fit is generated during pressing-against between the brake blocks 22 and the brake disc 29. Alternatively instead of directly on the end sides of the brake blocks 22 the friction coating can also be applied to a disc connected to the brake blocks 22, in particular screwed thereon.

Here the surfaces to which the friction coating is applied are generated, for example, by a circular milling with an average roughness depth Rz of 10 µm or better, or also by a fine turning with an average roughness depth $R_a$ equal to 1.6 µm or better transversely to the processing direction and $R_a$ equal to 0.7 µm or better along the processing direction. In other embodiments can of course additionally or alternatively also be ground and/or honed.

Here in terms of manufacturing technology an undercoating of nickel, having a thickness of, for example, approximately 2 to at most 5 µm, is galvanically applied to the surface. The hard-material particles having a Mohs hardness of greater than or equal to 7, in particular of 10, and after a sieving, a particle size falling in the range of 35 to 48 µm are then applied to this undercoating. In particular an industrial diamond powder having the mesh size D46 is used. Subsequently an upper coating of nickel is also galvanically applied thereto so that the particles deposited on the undercoating are surrounded by the upper coating at least in their lower region toward the undercoating, so that the particles are fixed virtually single-layer. In particular the thickness of the upper coating is selected such that approximately half of the particle size is embedded in the upper coating. A friction coating is thus provided wherein the diamond particles are securely fixed in the nickel layer and project uniformly on average from the nickel fixing layer. High to very high friction values of up to µ≥0.65 are thus advantageously achievable. During pressing of the brake blocks 22 against the brake disc 28 the projecting parts of the diamond particles of said micro-interference fit press into the brake disc 29 in a forming manner, which brake disc 29 is formed from a softer material in comparison to the diamond particles, in particular a steel or spheroidal graphite cast iron. It is important here for the interference fit that with the pressing against the necessary surface pressure is applied, in particular in the range of 80 to 180 MPa.

Thus even in the case of a hydraulic pressure loss the main shaft 10 remains securely fixed, in the pressed-against state fixing bolts 27 are screwable-in, which fixing bolts 27 maintain the brake position of the brake blocks 22 even with a hydraulic pressure drop. A comparable effect can alternatively also be achieved using a correspondingly securely configured hydraulic system.

In a manner not shown in more detail a sensor system is advantageously added that in conjunction with a corresponding control and monitoring unit reliably prevents inter alia incorrect actuations of the brake system. Here an actuation of the inventive locking brake is only permitted when a complete or approaching stoppage of the main shaft 10 has been detected by the sensor system. Furthermore the rotational position of the individual rotor blades and/or the rotational position of the unit of the three rotor blades with respect to the tower of the wind turbine and/or a monitoring of the clamping force of the brake can be taken into account. In this context the control and monitoring unit can of course also be configured such that the controlling, regulating, and monitoring can also be effected from a distance, which, for example, advantageously makes possible an actuation of the brake via remote maintenance.

Instead of the hydraulic actuation it can also be actuated by electric actuator. Here the otherwise usual hydraulic system can be omitted. If in particular electric actuators are used in a self-locking or self-blocking design, for example, using a roller screw drive, a system arises in a particularly simple manner that maintains the locking of the main shaft even in the event of a power failure.

In another embodiment the inventive brake system can also be configured drum-brake-type by at least one correspondingly formed brake shoe being provided for pressing radially against a cylindrical region, specifically designed for this purpose, of the main shaft or against a hollow cylinder surrounding the main shaft and fixedly connected thereto, instead of the brake blocks 22 and the brake disc 29.

In turn in another embodiment the tower-housing bearing 50 can also of course additionally or alternatively be equipped with an inventive brake system.

The invention claimed is:

1. A system comprising:
a wind turbine having a fixed part and a rotational part, the rotational part including a main shaft and a rotor blade hub mounted on the main shaft,
a brake disk fixedly mounted to the main shaft for rotation with the rotational part,
at least one brake block movably connected with the fixed part and having a friction surface facing the brake disk, the at least one brake block being shiftable between a first position with the friction surface spaced from the brake disk and a second position with the friction surface in contact with and pressed against the brake disk only when there is a complete or approaching stoppage of the rotational part,
the friction surface and/or the brake disk being configured such that pressing the at least one brake block against the brake disk creates a micro-interference fit between the at least one brake block and the brake disk in which particles on the brake block friction surface press into the brake disk so as to prevent relative rotation between the at least one brake block and the brake disk to thereby secure the main shaft against rotational or pivotal movements.

2. The system according to claim 1,
wherein the wind turbine comprises a multimegawatt turbine,
wherein the rotational part comprises a main shaft of the wind turbine, and
wherein the brake block is located proximate a rotational bearing.

3. The system according to claim 1, wherein the brake block is shiftable axially from the first position to the second position.

4. The system according to claim 1, wherein the at least one brake block comprises a first brake block on a first axial side of the brake disk and a second brake block on a second axial side of the brake disk.

5. The system according to claim 1, including a linear actuator configured to shift the at least one brake block between the first and second positions.

6. The system according to claim 5, wherein the linear actuator is a hydraulic actuator.

7. The system according to claim 5, wherein the linear actuator is a roller screw drive.

8. The system according to claim 1, including a sensor and a control system, so that even from a distance the actuation of the brake depending on a rotational angle position and/or rotational speed of the rotational part and/or the pressing-against force can be controllable, regulatable, and/or monitorable.

9. The system according to claim 1, wherein the friction surface or a surface of the at least one brake block includes hard material particles projecting from a nickel layer.

10. The system according to claim 9, wherein the hard material particles comprise diamond particles.

11. The system according to claim 10, wherein the diamond particles have an average particle size of 35 µm to 48 µm.

12. The system according to claim 9, wherein the hard material particles are located on the at least one brake block and the surface of the at least one brake block comprises steel.

13. The system according to claim 1, wherein the brake disk is fixedly mounted on the main shaft.

14. The system as recited in claim 1, further comprising a brake base body fixedly connected to the fixed part, the at least one brake block being movably coupled with the brake base body, and a plurality of manually operable fixing bolts extending between the brake base body and the at least one brake block and configured to maintain the at least one brake block engaged with the brake disk.

15. A system comprising:
a wind turbine having a fixed part and a rotational part, the rotational part including a main shaft and a rotor blade hub mounted on the main shaft,
a brake disk fixedly mounted on the main shaft for rotation with the main shaft,
at least one brake block movably connected with the fixed part and having a friction surface facing the brake disk, the at least one brake block being shiftable between a first position with the friction surface spaced from the brake disk and a second position with the friction surface in contact with and pressed against the brake disk only when there is a complete or approaching stoppage of the rotational part,
the friction surface and/or the brake disk being configured such that pressing the at least one brake block against the brake disk creates a micro-interference fit between the at least one brake block and the brake disk in which particles of the brake block friction surface press into the brake disk so as to prevent relative rotation between the at least one brake block and the brake disk to thereby secure the main shaft against rotational or pivotal movements.

\* \* \* \* \*